(12) United States Patent
Koo et al.

(10) Patent No.: US 7,196,750 B2
(45) Date of Patent: Mar. 27, 2007

(54) FLAT DISPLAY APPARATUS

(75) Inventors: Young-Dong Koo, Yongin-si (KR); Chun-Seok Ko, Gyeonggi-do (KR)

(73) Assignee: Samsung Electronics, Co., Ltd., Gyeonggi-do (KR)

( * ) Notice: Subject to any disclaimer, the term of this patent is extended or adjusted under 35 U.S.C. 154(b) by 49 days.

(21) Appl. No.: 10/840,085

(22) Filed: May 5, 2004

(65) Prior Publication Data
US 2004/0252254 A1    Dec. 16, 2004

(30) Foreign Application Priority Data
Jun. 2, 2003    (KR)    .................. 10-2003-0035292

(51) Int. Cl.
*G02F 1/1333*    (2006.01)
(52) U.S. Cl. .................. 349/59; 349/58; 361/681
(58) Field of Classification Search ............ 349/58, 349/59; 361/681
See application file for complete search history.

(56) References Cited

U.S. PATENT DOCUMENTS 5,929,950 A  *  7/1999 Matsuda .............. 349/60

6,847,417 B2 *  1/2005 Kim .................. 349/58
2004/0239828 A1 * 12/2004 Cho .................. 349/58

FOREIGN PATENT DOCUMENTS

| JP | 10-020308 | * | 1/1998 |
| JP | 2000-181362 | * | 6/2000 |

* cited by examiner

*Primary Examiner*—Huyen Ngo
(74) *Attorney, Agent, or Firm*—MacPherson Kwon Chen & Heid LLP

(57) ABSTRACT

In a flat display apparatus capable of decreasing an emission of an electromagnetic radiation, a flat display apparatus includes a flat display panel, a first receiving container, a driving part, a second receiving container and a ground member. The flat display panel displays an image. The first receiving container receives the flat display panel. The driving part is disposed on the first receiving container to drive the flat display panel. The second receiving container covers the driving part to block an electromagnetic radiation radiated from the driving part. The ground member is formed with the second receiving container to electrically connect the first receiving container to the second receiving container. Therefore, the second receiving container is electrically connected to an earth potential through the ground member and the first receiving container to decrease the emission of the electromagnetic radiation.

14 Claims, 5 Drawing Sheets

FLAT DISPLAY APPARATUS

CROSS-REFERENCE OF RELATED APPLICATIONS

The present application claims priority from Korean Patent Application No. 2003-35292, filed on Jun. 2, 2003, the disclosure of which is hereby incorporated herein by reference in its entirety.

BACKGROUND OF THE INVENTION

1. Field of the Invention

The present invention relates to a flat display apparatus. More particularly, the present invention relates to a flat display apparatus capable of decreasing an emission of an electromagnetic radiation.

2. Description of the Related Art

A display apparatus having a cathode ray tube (CRT) is used as a monitor of a television receiver set, a measurement and control system, a personal computer (PC), etc.

The display apparatus having the cathode ray tube (CRT) has large size, heavy weight and high power consumption.

A flat display apparatus is smaller and lighter than the display apparatus having the cathode ray tube (CRT). The flat display apparatus is classified into a liquid crystal display (LCD) apparatus, a plasma display panel (PDP), an organic electro luminescent display (OELD) apparatus, etc. The LCD apparatus has various characteristics, for example, such as high luminance, high efficiency, uniform luminance, long lifetime, thin thickness, light weight and low cost and so on.

A timing signal, a data signal, a driving signal, an image signal, etc., are applied to the LCD apparatus. A portion of the signals is generated from an integrated circuit of a printed circuit board (PCB). The LCD apparatus radiates electromagnetic radiations formed by the signals.

Power consumption of a backlight assembly that supplies an LCD panel of the LCD apparatus with a light increases in proportion to a size of the LCD panel. Therefore, an amount of the electromagnetic radiation radiated from the LCD apparatus increases in proportion to the power consumption of the backlight assembly.

In particular, the integrated circuit generates an electromagnetic radiation of high frequency. Therefore, an electro magnetic interference (EMI) may occur.

When the electromagnetic radiation is radiated to an electronic instrument or a human body, a malfunction of the electronic instrument or a human disease may occur.

BRIEF SUMMARY OF THE INVENTION

The present invention provides a flat display apparatus capable of decreasing an emission of an electromagnetic radiation.

The flat display apparatus in accordance with an aspect of the present invention includes a flat display panel, a first receiving container, a driving part, a second receiving container and a ground member. The flat display panel displays an image. The first receiving container receives the flat display panel. The driving part is disposed on the first receiving container to drive the flat display panel. The second receiving container covers the driving part to block an electromagnetic radiation radiated from the driving part. The ground member is formed with the second receiving container to electrically connect the first receiving container to the second receiving container.

The flat display apparatus in accordance with another aspect of the present invention includes a display unit, a bottom chassis, a printed circuit board (PCB), a PCB case and a ground member. The display unit displays an image. The bottom chassis is disposed under the display unit to receive the display unit. The printed circuit board (PCB) is disposed under the bottom chassis to apply an electric signal to the display unit. The PCB case is disposed under the bottom chassis. The PCB case includes a bottom surface, a sidewall protruded from a side of the bottom surface and a receiving space defined by the sidewall to receive the printed circuit board to block an electromagnetic radiation generated from the printed circuit board (PCB). The ground member is formed with the PCB case. The ground member is disposed between the sidewall and the bottom chassis to electrically connect the PCB case to the bottom chassis.

The flat display apparatus in accordance with still another aspect of the present invention includes a display unit, a backlight assembly, a bottom chassis, an inverter, an inverter case and a ground member. The display unit displays an image. The backlight assembly is disposed under the display unit to supply the display unit with a light. The bottom chassis is disposed under the backlight assembly to receive the display unit and the backlight assembly. The inverter is disposed under the bottom chassis to apply an electric signal and an electric power to the display unit. The inverter case is disposed under the bottom chassis. The inverter case includes a bottom surface, a sidewall protruded from a side of the bottom surface and a receiving space defined by the sidewall to receive the inverter to block an electromagnetic radiation generated from the inverter. The ground member is formed with the inverter case. The ground member is disposed between the sidewall and the bottom chassis to electrically connect the inverter case to the bottom chassis.

Therefore, the ground member is disposed between the PCB case and the bottom chassis or between the inverter case and the bottom chassis so that the PCB case or the inverter case is electrically connected to the earth potential, thereby decreasing the emission of the electromagnetic radiation.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE PREFERRED EMBODIMENTS

It should be understood that the exemplary embodiments of the present invention described below may be varied modified in many different ways without departing from the inventive principles disclosed herein, and the scope of the present invention is therefore not limited to these particular following embodiments. Rather, these embodiments are provided so that this disclosure will be through and complete, and will fully convey the concept of the invention to those skilled in the art by way of example and not of limitation.

Hereinafter, the present invention will be described in detail with reference to the accompanying drawings.

Figure 1:
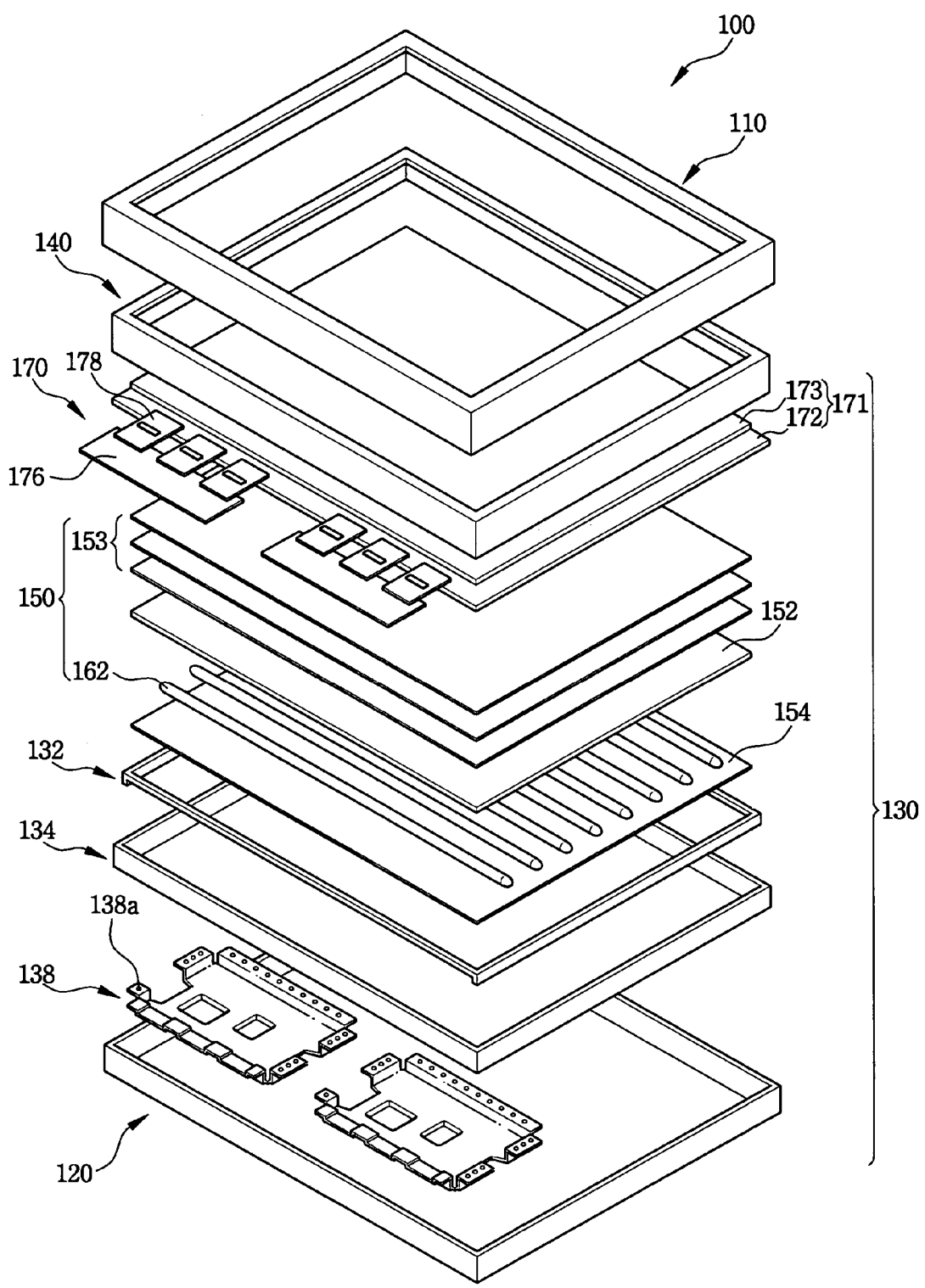
FIG. 1 is an exploded perspective view showing an LCD apparatus in accordance with an exemplary embodiment of the present invention.
Figure 2:
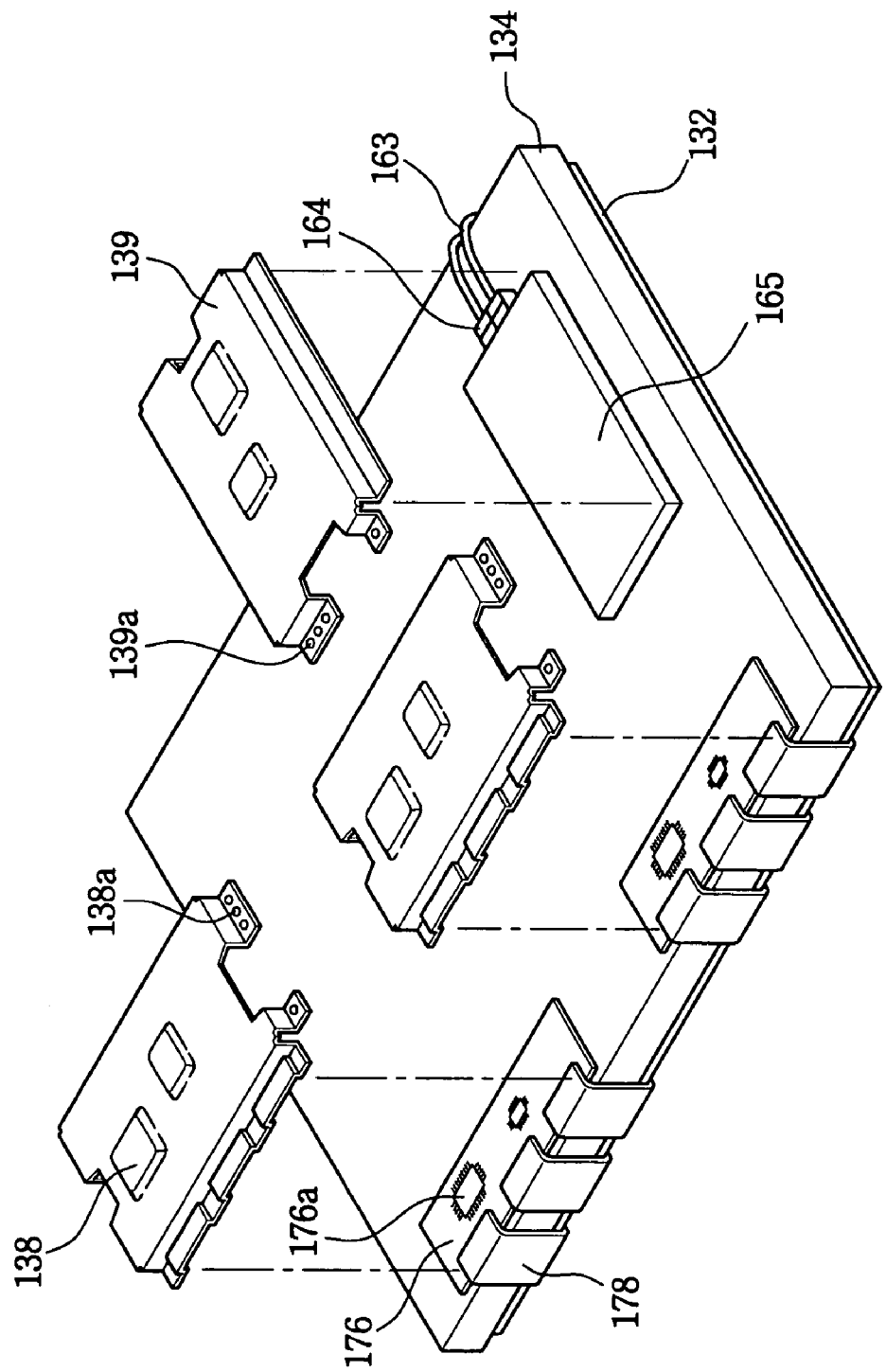
FIG. 2 is a perspective view showing a backside of the LCD apparatus shown in FIG. 1.

FIG. 1 is an exploded perspective view showing an LCD apparatus in accordance with an exemplary embodiment of the present invention. FIG. 2 is a perspective view showing a backside of the LCD apparatus shown in FIG. 1.

Referring to FIGS. 1 and 2, the LCD apparatus 100 includes an LCD module 130, a front case 110 and a rear case 120. The LCD module 130 displays an image in response to an image signal. The front and rear cases 110 and 120 receive the LCD module 130.

The LCD module 130 includes a display unit 170 and a backlight assembly 150. The display unit 170 includes an LCD panel 171. The backlight assembly 150 supplies the display unit 170 with a light.

The display unit 170 includes an LCD panel 171, a printed circuit board (PCB, 176) and a tape carrier package (TCP, 178). The image is displayed on the LCD panel 171.

The LCD panel 171 includes a thin film transistor (TFT) substrate 172, a color filter substrate 173 and a liquid crystal (not shown).

When a timing signal and a driving signal are applied to a gate electrode and a source electrode of a TFT of the TFT substrate 172, respectively, an electric field is formed between a pixel electrode of the TFT substrate 172 and a common electrode of the color filter substrate 173. The liquid crystal (not shown) varies arrangement in response to the electric field applied thereto, and a light transmittance of the liquid crystal (not shown) may be changed.

The arrangement and the light transmittance of the liquid crystal (not shown) are controlled by the driving signal and the timing signal. The timing signal is applied to the gate electrode of the TFT through a gate line. The driving signal is applied to the source electrode of the TFT through a data line.

When the driving signal and the timing signal are applied to the data line and the gate line, the driving signal and the timing signal are applied to the source electrode and the gate electrode of the TFT, respectively. Therefore, the TFT is turned on/off to output an electric signal to a drain electrode of the TFT.

The color filter substrate 173 is disposed at a position corresponding to the TFT substrate 172. The color filter substrate 173 includes a color filter. When a light passes through the color filter, a light having a predetermined color is formed. The color filter includes a red color filter portion, a green color filter portion and a blue color filter portion. The color filter may be formed through a photo process or a photolithography process. The common electrode including an indium tin oxide (ITO) is formed on the color filter substrate 173.

The backlight assembly 150 is disposed under the display unit 170. The backlight assembly 150 supplies the display unit 170 with the light having a uniform luminance. The backlight assembly 150 includes a light guide plate 152, an optical sheet assembly 153, a lamp 162 and a reflecting plate 154. The backlight assembly 150 may also include a lamp assembly having a plurality of the lamps. The lamp 162 generates a light. The light guide plate 152 guides the light generated from the lamp 162 into the display unit 170. The optical sheet assembly 153 uniformizes the light exiting from the light guide plate 152. A portion of the light generated from the lamp 162 is reflected from the reflecting plate 154 into the light guide plate 152. The backlight assembly 150 includes an inverter 165 and an inverter case 139. The inverter 165 applies a lamp driving signal and an electric power to the lamp 162 of the backlight assembly 150. The inverter case 139 covers the inverter 165.

A second embossed pattern 139a is disposed on the inverter case 139. Alternatively, the second embossed pattern 139a may be integrally formed with the inverter case 139. The second embossed pattern 139a is disposed between the inverter case 139 and the bottom chassis 134. The inverter case 139 is electrically connected to the bottom chassis 134 through the second embossed pattern 139a so that the inverter case 139 is electrical connected to an earth potential through the second embossed pattern 139a and the bottom chassis 134. In addition, the inverter case 139 protects the inverter 165 from an impact that is provided from an exterior to the LCD apparatus 100.

The LCD apparatus 100 includes a direct illumination type backlight assembly. Alternatively, the LCD apparatus 100 may include an edge illumination type backlight assembly.

The display unit 170 is disposed on the backlight assembly 150. The display unit 170 and the backlight assembly 150 are received in the bottom chassis 134. A mold frame 132 is disposed between the backlight assembly 150 and the bottom chassis 134 to support the backlight assembly 150. The top chassis 140 is disposed at a position corresponding to the mold frame 132 to secure the display unit 170.

The printed circuit board (PCB) 176 is disposed under the bottom chassis 134. The printed circuit board (PCB) 176 is electrically connected to the LCD panel 171 through the tape carrier package 178.

The PCB case 138 is disposed under the bottom chassis 134. The PCB case 138 receives the printed circuit board (PCB) 176 to prevent an emission of an electromagnetic radiation. The PCB case 138 includes a first bottom surface, a first sidewall and a first receiving space. The first sidewall is protruded from a side of the first bottom surface. The first receiving space is defined by the first sidewall. The PCB case 138 protects the printed circuit board (PCB) 176 from the impact that is provided from the exterior to the LCD apparatus 100.

The first embossed pattern 138a is disposed on the PCB case 138. Alternatively, the first embossed pattern 138a may be integrally formed with the PCD case 138. The first embossed pattern 138a is disposed between the first sidewall of the PCB case 138 and the bottom chassis 134 so that the bottom chassis 134 is electrically connected to the PCB case 138. Therefore, the PCB case 138 is electrically connected to the earth potential through the first embossed pattern 138a and the bottom chassis 134.

The LCD apparatus 100 includes an integrated printed circuit board (PCB) 176 having a data printed circuit board (PCB) and a gate printed circuit board (PCB) that is integrated with the data printed circuit board (PCB). Alternatively, the LCD apparatus 100 may include a data printed circuit board (PCB) and a gate printed circuit board (PCB) spaced apart from the data printed circuit board (PCB). When the LCD apparatus 100 includes the data printed circuit board (PCB) and the gate printed circuit board (PCB) spaced apart from the data printed circuit board (PCB), the LCD apparatus 100 includes a data PCB case, a gate PCB case, a first data embossed pattern that is disposed on the data PCB case, and a first gate PCB case that is disposed on the gate PCB case.

In addition, the LCD apparatus 100 may further include a plurality of the printed circuit boards (PCBs), a plurality of the PCB cases, and a plurality of the first embossed patterns that are disposed on the PCB cases.

The mold frame 132 includes an insulating material. The backlight assembly 150 includes a lamp 162, a reflecting plate 154 and optical sheet assembly 153. The backlight assembly 150 may include a plurality of the lamps.

The LCD panel 171 is electrically connected to an end portion of the printed circuit board (PCB) 176 through the tape carrier passage (TCP) 178. The tape carrier passage (TCP) 178 is bended toward a backside of the bottom chassis 134 so that the PCB 176 is disposed on the backside of the bottom chassis 134.

The printed circuit board (PCB) 176 disposed on the backside of the bottom chassis 134 includes a plurality of driving integrated circuits 176a that generate driving signals.

The driving integrated circuits 176a radiates an electromagnetic radiation. The PCB case 138 blocks the electromagnetic radiation. The blocked electromagnetic radiation induces an electric current in the PCB case 138. The PCB case 138 that blocks the electromagnetic radiation is electrically connected to the earth potential through the first embossed pattern 138a and the bottom chassis 134.

The PCB case 138 covers the printed circuit board (PCB) 176. Alternatively, the PCB case 138 may cover a portion of the printed circuit board (PCB) 176.

The lamp 162 is electrically connected to the inverter 165 through a wire 163. The inverter 165 applies a driving signal and an electric power to the lamp 162. The wire 163 is bended toward the backside of the bottom chassis 134 so that the inverter 165 is disposed on the backside of the bottom chassis 134. Alternatively, a connecter 164 may be disposed between the inverter 165 and the wire 163.

The inverter 165 radiates an electromagnetic radiation. The inverter case 139 blocks the electromagnetic radiation. The blocked electromagnetic radiation induces an electric current in the inverter case 139. The inverter case 139 that blocks the electromagnetic radiation is electrically connected to the earth potential through the second embossed pattern 139a and the bottom chassis 134.

Figure 3:
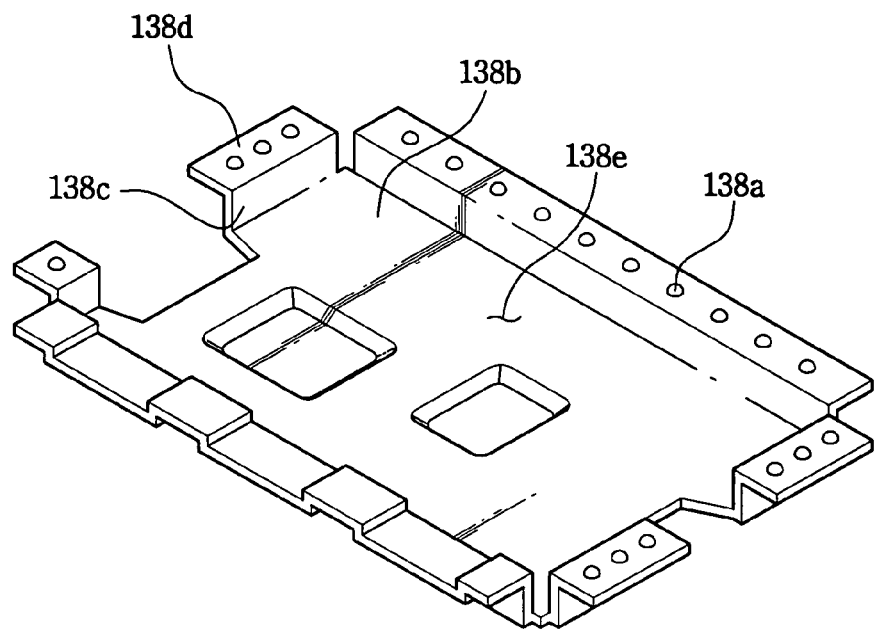
FIG. 3 is a perspective view showing a PCB case shown in FIG. 1.

FIG. 3 is a perspective view showing a PCB case shown in FIG. 1.

Referring to FIGS. 1 to 3, the PCB case 138 includes the first bottom surface 138b, the first sidewall 138c and the first receiving space 138e. The first sidewall 138c is protruded from the side of the first bottom surface 138b. The first sidewall 138c defines the first receiving space 138e that receives the PCB 176. The first sidewall 138c includes a first extended portion 138d that is extended in a direction in parallel with the first bottom surface 138b from an end portion opposite to the first bottom surface 138b.

The first embossed pattern 138a is disposed on the first extended portion 138d. Alternatively, the first extended portion 138d may be omitted so that the first embossed pattern 138a is disposed on the end portion opposite to the first bottom surface 138b. The first embossed pattern 138a is disposed on the first extended portion 138d so that the PCB case 138 is electrically connected to the bottom chassis 134. The first embossed pattern 138a has a hemispheric shape, a polypyramidal shape, a cylindrical shape, a polyprismatic shape, etc.

The PCB case 138 blocks the electromagnetic radiation radiated from the printed circuit board (PCB) 176 so that the electromagnetic radiation induces the electric current in the PCB case 138. The induced current formed in the PCB case 138 is electrically connected to the earth potential through the first embossed pattern 138a and the bottom chassis 134.

Figure 4:
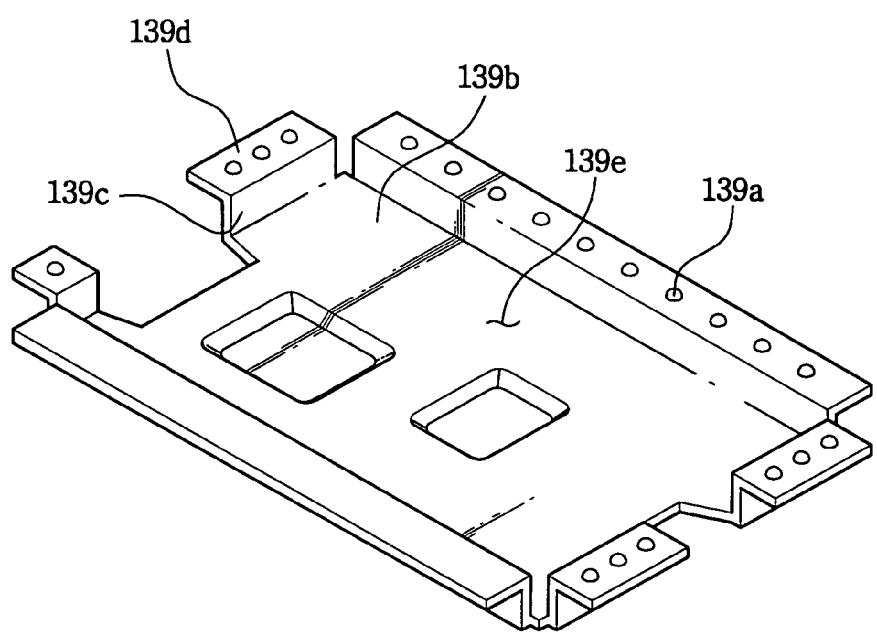
FIG. 4 is a perspective view showing an inverter case shown in FIG. 2.

FIG. 4 is a perspective view showing an inverter case shown in FIG. 2.

Referring to FIGS. 1, 2 and 4, the inverter case 139 includes the second bottom surface 139b, the second sidewall 139c and the second receiving space 139e. The second sidewall 139c is protruded from the side of the second bottom surface 139b. The second sidewall 139c defines the second receiving space 139e that receives the inverter 165. The second sidewall 139c includes a second extended portion 139d that is extended in a direction in substantially parallel with the second bottom surface 139b from an end portion opposite to the second bottom surface 139b.

The second embossed pattern 139a is disposed on the second extended portion 139d. Alternatively, the second extended portion 139d may be omitted so that the second embossed pattern 139a is disposed on the end portion opposite to the second bottom surface 139b. The second embossed pattern 139a is disposed on the second extended portion 139d so that the inverter case 139 is electrically connected to the bottom chassis 134. The second embossed pattern 139a has the hemispheric shape, the polypyramidal shape, the cylindrical shape, the polyprismatic shape, etc.

The inverter case 139 blocks the electromagnetic radiation radiated from the inverter 165 so that the electromagnetic radiation induces the electric current in the inverter case 139. The induced current formed in the inverter case 139 is electrically connected to the earth potential through the second embossed pattern 139a and the bottom chassis 134.

According to this exemplary embodiment of the present invention, the first and second embossed patterns 138a and 139a are disposed between the PCB case 138 and the bottom chassis 134 and between the inverter case 139 and the bottom chassis 134, respectively, to decrease the emission of the electromagnetic radiation.

Figure 5:
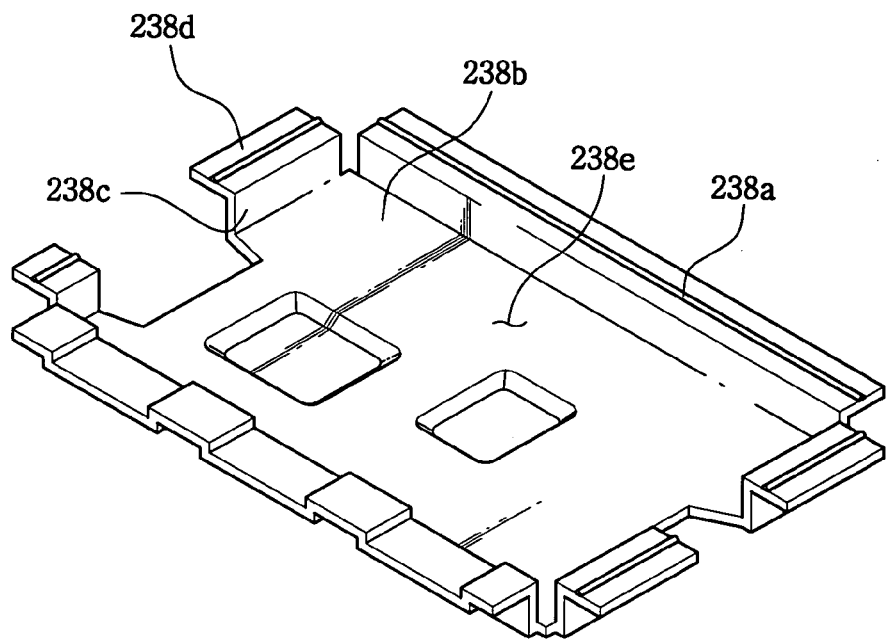
FIG. 5 is a perspective view showing a PCB case in accordance with another exemplary embodiment of the present invention.
Figure 6:
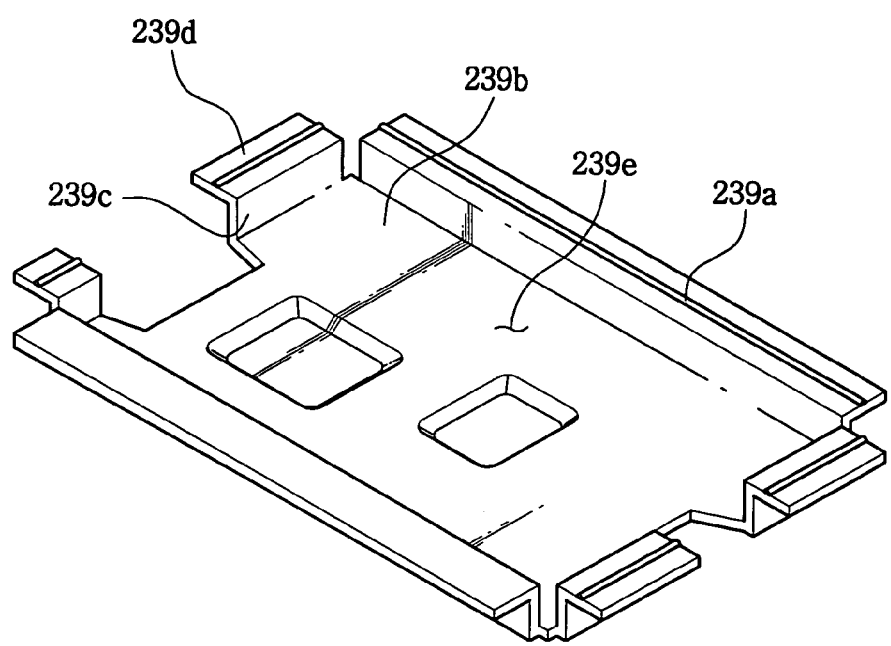
FIG. 6 is a perspective view showing an inverter case in accordance with another exemplary embodiment of the present invention.

FIG. 5 is a perspective view showing a PCB case in accordance with another exemplary embodiment of the present invention. FIG. 6 is a perspective view showing an inverter case in accordance with another exemplary embodiment of the present invention. Referring to FIGS. 5 and 6 in which the same reference numerals denote the same elements in FIGS. 1 to 4, and thus any further detailed descriptions concerning the same elements will be omitted except for an extended protrusion.

Referring to FIGS. 1, 2 and 5, a PCB case 238 includes a first bottom surface 238b, a first sidewall 238c and a first receiving space 238e. The first sidewall 238c is protruded from a side of the first bottom surface 238b. The first sidewall 238c defines the first receiving space 238e that receives a printed circuit board (PCB) 176. The first sidewall 238c includes a first extended portion 238d that is extended in a direction in substantially parallel with the first bottom surface 238b from an end portion opposite to the first bottom surface 238b.

The first extended protrusion 238a is disposed on the first extended portion 238d. Alternatively, the first extended portion 238d may be omitted so that the first extended protrusion 238a is disposed on the end portion opposite to the first bottom surface 238a. The first extended protrusion 238a is disposed on the first extended portion 238d so that the PCB case 238 is electrically connected to a bottom chassis 134. The first extended protrusion 238a has a hemispheric shape, a polypyramidal shape, a cylindrical shape, a polyprismatic shape, etc.

The PCB case 238 blocks the electromagnetic radiation radiated from the printed circuit board (PCB) 176 so that the electromagnetic radiation induces an electric current in the PCB case 238. The induced current formed in the PCB case 238 is electrically connected to an earth potential through the first extended protrusion 238a and the bottom chassis 134.

Referring to FIGS. 1, 2 and 6, an inverter case 239 includes a second bottom surface 239b, a second sidewall 239c and a second receiving space 239e. The second sidewall 239c is protruded from a side of the second bottom surface 239b. The second sidewall 239c defines the second receiving space 239e that receives an inverter 165. The second sidewall 239c includes a second extended portion 239d that is extended in a direction in substantially parallel with the second bottom surface 239b from an end portion opposite to the second bottom surface 239b.

The second extended protrusion 239a is disposed on the second extended portion 239d. Alternatively, the second extended portion 239d may be omitted so that the second extended protrusion 239a is disposed on the end portion opposite to the second bottom surface 239b. The second extended protrusion 239a is disposed on the second extended portion 239d so that the inverter case 239 is electrically connected to the bottom chassis 134. The second extended protrusion 239a has the hemispheric shape, the polypyramidal shape, the cylindrical shape, the polyprismatic shape, etc.

The inverter case 239 blocks the electromagnetic radiation radiated from the inverter 165 so that the electromagnetic radiation induces an electric current in the inverter case 239. The induced current formed in the inverter case 239 is electrically connected to the earth potential through the second extended portion 239a and the bottom chassis 134.

According to this exemplary embodiment of the present invention, the first and second extended protrusions 238a and 239a are disposed between the PCB case 238 and the bottom chassis 134 and between the inverter case 239 and the bottom chassis 134, respectively, to decrease the emission of the electromagnetic radiation.

Figure 7:
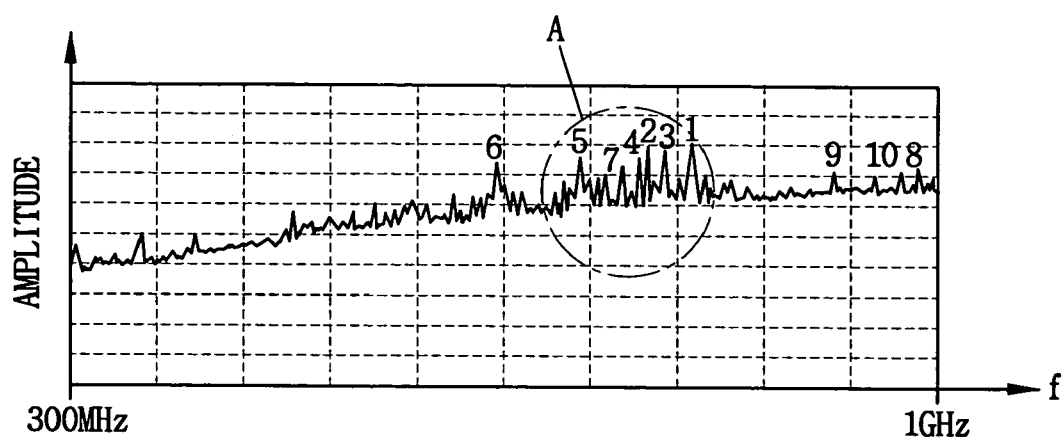
FIG. 7 is a graph showing a relationship between a frequency and an amplitude of an electromagnetic radiation of a conventional LCD apparatus.
Figure 8:
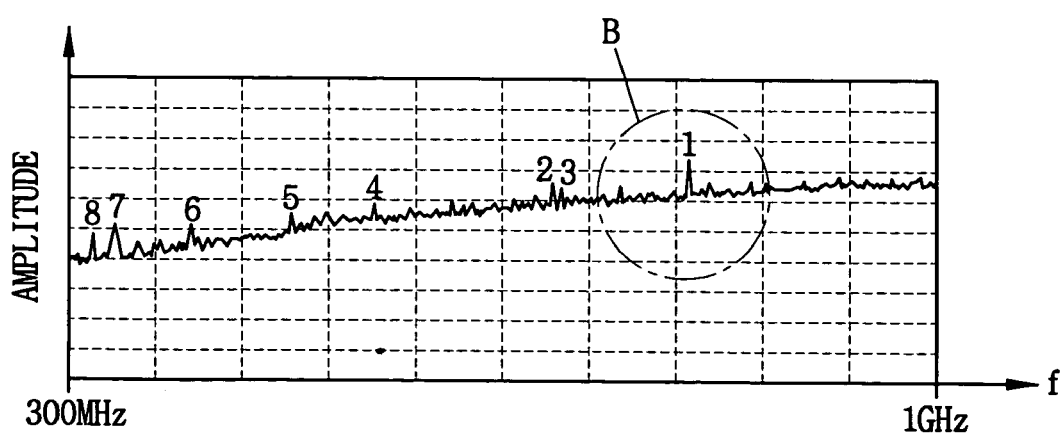
FIG. 8 is a graph showing a relationship between a frequency and an amplitude of an electromagnetic radiation of the LCD apparatus shown in FIG. 1.

FIG. 7 is a graph showing a relationship between a frequency and an amplitude of an electromagnetic radiation of a conventional LCD apparatus. FIG. 8 is a graph showing a relationship between a frequency and an amplitude of an electromagnetic radiation of the LCD apparatus shown in FIG. 1. Referring to FIGS. 7 and 8 in which the same reference numerals denote the same elements in FIGS. 1 to 4, and thus any further detailed descriptions concerning the same elements will be omitted except for an extended protrusion. The horizontal axis represents the frequency of the electromagnetic radiation and the vertical axis represents the amplitude of the electromagnetic radiation. The points represent frequencies corresponding to strong electromagnetic radiations.

Referring to a portion 'A' of FIG. 7, the conventional LCD apparatus radiates an electromagnetic radiation having a frequency of about 700 MHz to about 800 MHz.

Referring to a portion 'B' of FIG. 8, an amount of an electromagnetic radiation having the frequency of about 700 MHz to about 800 MHz, which is radiated from the LCD apparatus of the exemplary embodiment of the present invention, is smaller than that of the conventional LCD apparatus.

TABLE 1 represents the frequency and the amplitude corresponding to each of the points.

| No. of Point | Conventional LCD Apparatus | | LCD Apparatus of First Exemplary Embodiment | |
|---|---|---|---|---|
| | Frequency [MHz] | Amplitude [dBμm] | Frequency [MHz] | Amplitude [dBμm] |
| 1 | 801 | 40.61 | 801 | 36.49 |
| 2 | 766 | 40.45 | 890 | 32.96 |
| 3 | 780 | 39.3 | 697 | 32.15 |
| 4 | 759 | 38.52 | 547 | 29.73 |
| 5 | 711 | 38.37 | 480 | 27.84 |
| 6 | 643 | 36.87 | 402 | 25.62 |
| 7 | 745 | 36.41 | 339 | 25.41 |
| 8 | 983 | 36.4 | 321 | 23.92 |
| 9 | 914 | 36.13 | | |
| 10 | 948 | 35.51 | | |

Referring to Table 1, the conventional LCD apparatus radiates strong electromagnetic radiations having the amplitude of about 40.61 dBμm corresponding to the frequency of about 801 MHz, the amplitude of about 40.45 dBμm corresponding to the frequency of about 766 MHz, the amplitude of about 39.3 dBμm corresponding to the frequency of about 780 MHz, the amplitude of about 38.52 dBμm corresponding to the frequency of about 759 MHz, and the amplitude of about 38.37 dBμm corresponding to the frequency of 711 MHz.

The conventional LCD apparatus has four points corresponding to the frequency of about 700 MHz to about 800 MHz. In contrast, the LCD apparatus in accordance with the exemplary embodiment of the present invention does not have any point corresponding to the frequency of about 700 MHz to about 800 MHz.

Therefore, an inverter case and a PCB case of the LCD apparatus in accordance with the exemplary embodiment of the present invention decreases the emission of the electromagnetic radiations that are generated from a PCB and an inverter. In addition, induced currents that are induced by the electromagnetic radiations are connected to an earth potential to improve a display quality of the LCD apparatus.

According to the present invention, the embossed pattern is disposed between the PCB case and the bottom chassis or between the inverter case and the bottom chassis so that the PCB case of the inverter case is electrically connected to the earth potential through the embossed pattern and the bottom chassis, thereby decreasing the emission of the electromagnetic radiation.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A flat display apparatus comprising:
   a flat display panel displaying an image;
   a first receiving container receiving the flat display panel;
   a driving part disposed on the first receiving container to drive a part of the flat display apparatus;
   a second receiving container covering the driving part to block an electromagnetic radiation radiating from the driving part; and
   a ground member including a first embossed pattern protruding from a surface of the second receiving container, wherein the ground member is disposed between the first receiving container and the second receiving container to electrically connect the first receiving container to the second receiving container.

2. The flat display apparatus of claim 1, wherein the driving part comprises a printed circuit board (PCB) that applies an electric signal to the flat display panel.

3. The flat display apparatus of claim 2, wherein the second receiving container comprises a bottom surface, and side walls protruding from the bottom surface to define a receiving space for the printed circuit board (PCB), and wherein the ground member is disposed between the at least one of the sidewalls and the first receiving container.

4. The flat display apparatus of claim 3, further comprising an extended portion that extends from the sidewalls in a plane substantially parallel to the bottom surface, wherein the ground member is disposed on the extended portion.

5. The flat display apparatus of claim 1, further comprising a backlight assembly including a lamp assembly that generates a light, an optical sheet assembly that improves optical characteristics of the light generated from the lamp, and wherein the flat display panel comprises a liquid crystal display (LCD) panel receiving the light that passes through the optical sheet assembly to display an image by using a liquid crystal disposed between substrates of the liquid crystal display panel.

6. The flat display apparatus of claim 5, wherein the driving part comprises an inverter that drives the lamp assembly.

7. The flat display apparatus of claim 5, wherein the second receiving container comprises a bottom surface, protruded and sidewalls protruding from the bottom surface and to define a receiving space for receiving the inverter, and wherein the ground member is disposed between at least one of the sidewalls and the first receiving container.

8. The flat display apparatus of claim 5, wherein the ground member comprises an embossed pattern.

9. A flat display apparatus comprising:
   a display unit displaying an image;
   a backlight assembly disposed under the display unit to supply the display unit with a light;
   a bottom chassis disposed under the backlight assembly to receive the display unit and the backlight assembly;
   an inverter disposed under the bottom chassis to apply an electric signal and an electric power to the backlight assembly;
   an inverter case disposed under the bottom chassis, the inverter case including a bottom surface, and side walls protruding from the bottom surface and to define a receiving space for the inverter; the inverter case blocking electromagnetic radiation generated from the inverter; and
   a ground member including embossed patterns protruding from a surface of the inverter case, the ground member being disposed between at least one of the sidewalls and the bottom chassis to electrically connect the inverter case to the bottom chassis.

10. The flat display apparatus of claim 9, wherein the sidewalls comprise an extended portion that extends in a plane parallel to the bottom surface, and the ground member is disposed on the extended portion.

11. The flat display apparatus of claim 9, wherein the ground member comprises an extended protrusion.

12. The flat display apparatus of claim 9, further comprising a mold frame disposed between the backlight assembly and the bottom chassis to support the backlight assembly.

13. A flat display apparatus comprising:
   a flat display panel displaying an image;
   a first receiving container receiving the flat display panel;
   a driving part disposed on the first receiving container to drive the flat display panel;
   a second receiving container covering the driving part to block electromagnetic radiation radiating from the driving part, the second receiving container including:
      a bottom surface,
      sidewalls extending from edges of the bottom surface, and
      an extended portion extending from the sidewalls; and
   a ground member protruding from a surface of the extended portion, the ground member being disposed between the first receiving container and the second receiving container to electrically connect the second receiving container to the first receiving container.

14. The flat panel display apparatus of claim 13, wherein the ground member comprises an embossed pattern or an extended protrusion.

* * * * *